Aug. 28, 1951     W. V. LOVELL     2,566,221
ELECTROMAGNETIC LEVITATION APPARATUS
Filed May 17, 1949
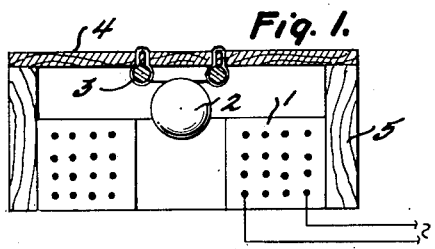
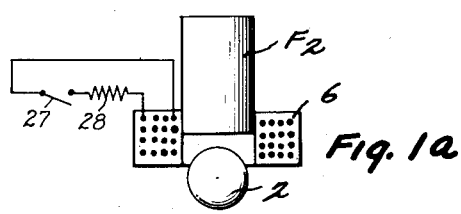
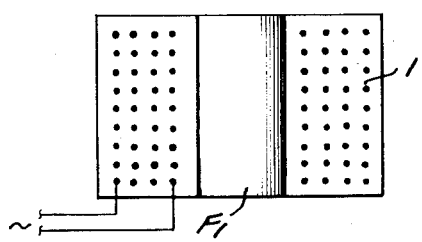
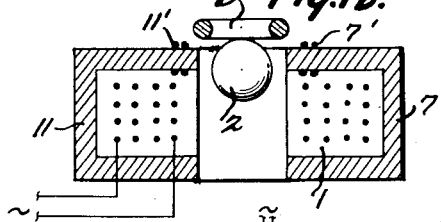
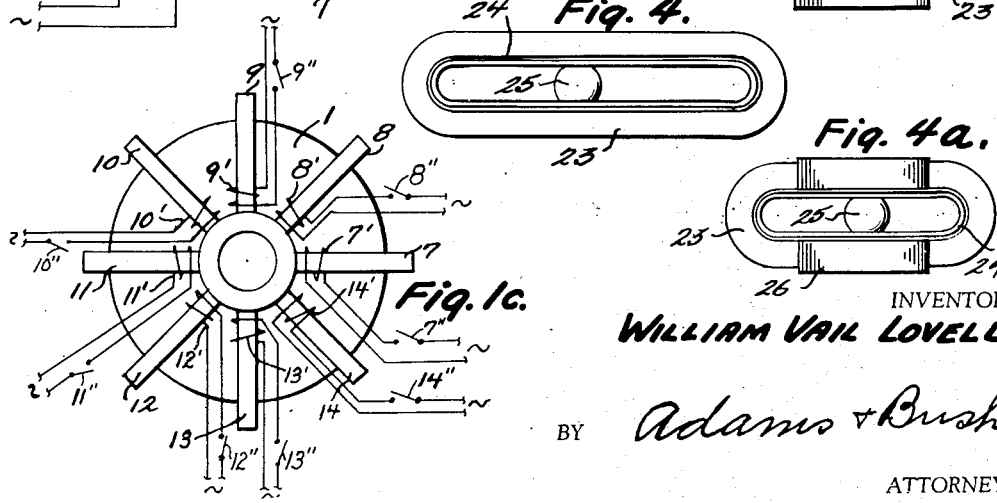
INVENTOR
WILLIAM VAIL LOVELL
BY Adams & Bush
ATTORNEYS Patented Aug. 28, 1951

2,566,221

UNITED STATES PATENT OFFICE 2,566,221

ELECTROMAGNETIC LEVITATION APPARATUS

William V. Lovell, Sanford, Fla., assignor to Anne Lovell, Orlando, Fla.

Application May 17, 1949, Serial No. 93,808

6 Claims. (Cl. 172—120)

My invention relates to a method of and apparatus for securing stable non-mechanical suspension of an object or objects in space without any mechanical guides or supports and capable of being so suspended even in a vacuum if desired. A further object is to provide for translatory movement of a suspended object in a path parallel to the earth's surface so as to comprise in effect a levitated bob pendulum.

Still another object is to provide a suspension such that the object is freely rotatable about a vertical axis, or a horizontal axis, or both. Again, it is an object to provide means to bring about the desired mode of rotation.

Another title for the invention is an electromagnetic levitator. The type of suspension achieved is a true levitation as distinct from other types of suspension.

It is felt that the types of suspension shown will be primarily useful for instructional and demonstrational purposes, but it is also expected that they will be useful as display apparatus, novelties and the like. The rotatable forms are intended for use in laboratories as components of stirring apparatus, centrifuges and the like. The practically frictionless character of the suspension is likewise deemed of value for possible use in gyroscope equipment.

Forms of electromagnetic levitation devices were shown in application Serial 221,639 filed July 27, 1938 by William V. Lovell, now abandoned, for a stable non-mechanical suspension of matter, of which this application is a continuation-in-part. The present application relates to forms of apparatus in which stabilized suspension is accomplished by means of combined upward repulsion forces, upward attraction forces, and inward centering forces on an object, derived by means of alternating current flux fields. The original application also showed forms which did not employ upward attraction forces, and another application Serial 252,688 filed January 24, 1939 by Lyle H. B. Peer which matured into Patent 2,377,175 showed forms of suspension brought about solely by means of lateral centering forces and upward repulsion forces.

Fig. 1 corresponds to Fig. 8 of the initial application and is a sectional view of levitation apparatus. Figs. 1a and 1b are modifications of this form in section while Fig. 1c is a plan view of the modification shown in Fig. 1b. Figs. 2 and 2a are vertical sectional views of a form arranged with a vertical shaft through a plurality of suspended objects, and Fig. 1c is also a plan view of the modification shown in Fig. 2a. Fig. 3 is a side view of an elongated form and Fig. 3a is a modification also in elevation. Figs. 4 and 4a are plan views of the modifications shown in section in Figs. 3 and 3a.

The principle of operation of the device may be understood by considering the facts that a coil carrying alternating current induces currents of substantially opposite phase in an adjacent coil or conducting ring, etc.; that unlike currents tend to repel each other (or the conductors carrying such currents do) while like currents attract, and finally, a conductor in which current is being induced in a non-uniform alternating current flux field tends to move into the region of weakest field. Taking Fig. 1, part 1 is a simple coil with an opening, in which coil alternating current is flowing. Part 2 is shown as a conducting sphere, and part 3 is a conducting ring taped or otherwise fastened to a cross support 4 of a material such as wood or plastic which is joined to a vertical support 5 so as to firmly hold the conducting ring in place above the object. The conducting object 2 having currents induced in it of substantially opposite phase to that of currents in 1 is repelled axially upward, and also inwardly toward the region of weaker field. Part 3 also has current induced in it of substantially opposite phase to that of current in 1, and there is consequently attraction between parts 3 and 2. The current in part 3 also tends to weaken the field in the region of the vertical axis of the assembly, particularly in the upper part, and consequently produces a centering force as described above. By properly proportioning the parts and current strength, sufficient combined repulsion between 1 and 2 and attraction between 2 and 3 is provided together with an effective lateral centering force so that the object 2 is maintained in stabilized suspension in space. The current in part 1 is adjusted to a value that will provide force enough to overcome gravity but not sufficient to force the object 2 high enough to touch part 3. If the object tends to rise due to any disturbance, current induced in it decreases because of decreased electromagnetic coupling with the coil, and the force per unit current also decreases, so that stability is maintained. Conversely, if the object is pushed downwardly, the induction and force increases enough to maintain stability. There are also lateral centering forces on the object.

In Fig. 1a the part 3 of Fig. 1 is shown as a coil of wire 6 which can be short circuited by a switch, part 21 or if desired a resistance part 28 can be connected in its circuit. This upper member may also be provided with an iron core F2 to increase its action.

In Fig. 1b the coil is shown provided with inwardly facing U-shaped pole pieces of magnetic material arranged in pairs as shown in plan view of Fig. 1c. The pole pieces will be taken as being eight in number, having parts number 7 to 14. Each pole piece has near the end of its upper limb a small shading coil to be designated by the pole number with a prime mark, as 7'. Leads from these shading coils are brought out to any convenient point to switches, identified by numerals corresponding to pole number but with double prime marks. Now if the odd numbered coils are short circuited, or connected in series and the group short circuited, a rotating field is set up by shading coil action so as to be moving from the unshaded to the shaded poles. If however the odd numbered coils are open and the even numbered coils short circuited the field will rotate in the opposite direction. The suspended object will rotate in the direction of the field rotation. In this way rotation in either direction about a vertical axis is accomplished, and with all shading coils open, no rotation results. Further, if a single coil is short circuited, a similar action sets up a field to rotate the object about a horizontal axis, in a direction controlled by the choice of shading coil short circuited.

In Fig. 2 a pair of objects 15 and 16 are shown one above the other and connected by a vertical shaft 17. The inducing coils are respectively 18 and 20, and the upper elements 19 and 21. The coils and rings are supported by framework not shown. This arrangement gives freedom of rotation about a vertical axis, and in Fig. 2a the inwardly facing pole pieces of Fig. 1b are repeated and the same arrangement of shading coils used to give a rotating field in either direction about the vertical axis, and the plan view of Fig. 1c also applies. In Fig. 2a the suspended objects are shown as short cylinders, 22, and the lower part of the figure is essentially a duplicate of the upper part. Fig. 2 represents a combination of Figs. 8 and 9 of the application 221,639 of which the present application is a continuation-in-part, and the inwardly facing pole pieces of Figs. 1b and 2a are taken from Fig. 4 of that application.

In Figs. 2 and 2a the same field that produces the suspension also brings about rotation when desired by the means described. The rotation can, however, be produced by other well known means. The shaft 17 may be extended and may be employed to carry stirring vanes, fan blades or centrifuge elements.

In Fig. 3 is shown an elongated form of coil 23, having an elongated upper conducting member 24 firmly fixed above it, and the two elements cooperate to suspend a conducting object 25, shown as a sphere so as to be free to oscillate to and fro as a pendulum bob having a substantial linear path in a horizontal plane and a central rest position. When the bob is set in motion, either by hand or by other means, it maintains an oscillation with a period characteristic to the length of the coil and other dimensional factors. The suspension is practically frictionless and can be made more nearly frictionless by enclosing the bob in a long cylindrical glass tube and evacuating the tube. In this case the bob may be set in motion by slightly tilting the coil assembly from one end. Fig. 3 represents a combination of Figs. 8 and 13 of application 221,639. Fig. 4 is a plan view of the apparatus shown in Fig. 3.

Figs. 3a and 4a show modifications of the apparatus of Figs. 3 and 4 with the addition of a bank of inwardly facing pole pieces 26 at each side as a magnetic circuit in the manner of Fig. 4 of application 221,639.

As specific embodiments many forms have been provided and data will be given on a few of these. For support of a 3" aluminum ball in apparatus of Fig. 1 a coil of 320 turns of #12 enameled wire is used. The coil is 1¾" in axial length, 3¾" interior diameter and 7½" outside diameter. A copper ring weighing 2¾ oz. having an inner diameter of 2⅞" is used as the upper element 3. With the bottom of the ring 1¾" above the top plane of the coil and 27 amperes flowing at 60 cycles, a 3" ball of 53 S. T. aluminum alloy floated freely with about ½" clearance from the upper member 3. On 23 amperes the minimum flotation value was found for a 3" ball of 2 S. H. aluminum. Using the iron arranged as in Fig. 1b these current values are greatly reduced—that is to about one half.

In the form shown as Fig. 2 a pair of these coils were used and with the added weight of a ½" aluminum shaft the flotation current for 3" balls of 53 S. T. aluminum with coils 18 and 20 in series in 28 amperes. The upper rings used are the same as mentioned above for the single coil, and similarly placed. The bottom of the upper coil is 8" above the top of the lower coil.

In the form shown in Fig. 3a, the long coil has 154 turns of #9 wire, is of 2" square section and the opening is 12" long by 2⅜" wide. With iron at the sides composed of long blocks of laminations just fitting over the coil, and having 9/16" section, the supporting current is 35 amperes for a solid 2" aluminum sphere. The upper member 24 is an aluminum rod ⅜" in diameter formed so as to have an aperture 1½", and is supported so as to have its lower surface flush with the upper surface of the lamination block. The period of the pendulum is then approximately six seconds.

The bottom coil need not contribute any centering force though it is convenient to have it do so. In Fig. 1b all the centering force as well as part of the lifting force comes from the upper members. For example, an aluminum sphere 1¼" in diameter is levitated in such a form with ½" clearance above the core of a bottom coil of coil of 500 turns of #10 wire, axial length 4", aperture 2½" filled with #18 gauge iron wire. The upper coil consists of 150 turns of #18 copper wire, has an aperture of 1½". The annular core fits the aperture, is 1¼" interior diameter, 2½" long and comes to ½" of the bottom of the coil 6. Current of 28 amperes at 60 cycles was used in bottom coil.

The armature may be hollow, resulting in lowered current density, and various other modifications may be made without departing from the spirit of my invention. The current density in bottom coils may be decreased by using higher frequency, such as 400 cycles. Using higher frequency the apparatus may be made to quite small dimensions.

The lifting effect of the elements shown for securing upward attraction forces can be made quite strong, as by increasing the amount of flux through such elements, and can in fact be made to equal or exceed the upward repulsion force.

The shape of the suspended object has been shown as spherical or cylindrical but the device is not so limited. Copper and aluminum have been used as material for the armatures.

I claim as my invention:

1. Suspension apparatus comprising a coil with an opening as means for producing electromagnetically an alternating flux field in a generally horizontal circular region of substantial depth, and a horizontal closed conductor fixed in position in the upper part of said region for establishing upward lifting attraction forces, and an armature of conducting material maintained in stabilized suspension in said field by a combination of said upward lifting attraction forces, upward lifting repulsion forces, and radial centering forces.

2. A levitated bob pendulum comprising electromagnetic means for producing an alternating flux field in a generally horizontal rectangular region of substantial depth, a horizontally disposed closed circuit conducting member of substantially the same rectangular shape as the electromagnetic means fixed in the upper part of said region for establishing upward lifting attraction forces, and an armature of conducting material maintained in levitated suspension translatably along a longitudinal path in said field by a combination of lateral centering forces, upward lifting repulsion forces and upward lifting attraction forces.

3. Levitation apparatus comprising means for producing an alternating flux field in a generally circular region of substantial depth, a horizontal closed conductor fixed in position in the upper part of said region for establishing upward lifting attraction forces, means for causing said field to have a component of rotation about the vertical central axis of said region, and an armature of conducting material maintained in suspension in said field by a combination of upward lifting repulsion forces, upward attraction forces and radial centering forces, and caused to rotate about its vertical axis by induction motor action due to said rotating component of said field.

4. Levitation apparatus comprising means for producing an alternating flux field in a generally circular region of substantial depth, a horizontal closed conductor fixed in position in the upper part of said region for establishing upward lifting attraction forces, means for causing said field to have a component of rotation about a horizontal axis of said region, and an armature of conducting material maintained in suspension in said field by a combination of upward lifting repulsion forces, upward attraction forces and radial center forces, and caused to rotate about its horizontal axis by induction motor action due to said rotating component of said field.

5. Suspension apparatus in which a plurality of supporting and rotating means combinations as recited in claim 3 are mounted one above the other coaxially vertically and each combination having its armature as there recited, and in which the said armatures are connected with a vertical shaft to provide an armature assembly rotatable about a vertical axis.

6. Suspension apparatus comprising a first means for producting an alternating flux field in a generally horizontal circular region in which the magnetic field intensity is greatest at the bottom of said region and is approximately symmetrical horizontally with respect to the center of said region, a second means comprising a closed circuit positioned above the first means and coaxial therewith to produce an alternating flux field substantially opposing the first field in the upper part of the central region of said first field to establish upward lifting attraction force and an armature of conducting non-magnectic material held suspended in said central region by a combination of upward repulsion forces from the first field, upward attraction forces from the second field and by radial centering forces.

WILLIAM V. LOVELL.

REFERENCES CITED

The following references are of record in the file of this patent:

UNITED STATES PATENTS

| Number | Name | Date |
|---|---|---|
| 2,377,175 | Peer | May 29, 1945 |